United States Patent
Llado et al.

(10) Patent No.: US 12,545,118 B1
(45) Date of Patent: Feb. 10, 2026

(54) TORQUE DISTRIBUTION-BASED DECELERATION

(71) Applicant: Zoox, Inc., Foster City, CA (US)

(72) Inventors: Travis Anthony Llado, Half Moon Bay, CA (US); Joshua Caleb Wade, Redwood City, CA (US); Sage Michael Wolfe, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 133 days.

(21) Appl. No.: 18/239,834

(22) Filed: Aug. 30, 2023

(51) Int. Cl.
*B60L 7/00* (2006.01)
*B60L 7/26* (2006.01)

(52) U.S. Cl.
CPC ............. *B60L 7/26* (2013.01); *B60L 2240/14* (2013.01); *B60L 2240/423* (2013.01); *B60L 2250/26* (2013.01)

(58) Field of Classification Search
CPC .. B60L 7/26; B60L 2240/14; B60L 2240/423; B60L 2250/26
See application file for complete search history.

(56) References Cited

U.S. PATENT DOCUMENTS

| | | | | |
|---|---|---|---|---|
| 5,378,053 A | * | 1/1995 | Patient | B60L 3/108 303/3 |
| 5,511,859 A | * | 4/1996 | Kade | B60T 13/586 303/3 |
| 5,923,093 A | * | 7/1999 | Tabata | B60L 3/0061 903/910 |
| 6,406,105 B1 | * | 6/2002 | Shimada | B60L 7/26 303/152 |
| 6,811,229 B2 | * | 11/2004 | Soga | B60L 7/18 303/3 |
| 7,458,650 B2 | * | 12/2008 | Toyota | B60L 15/2036 303/169 |
| 7,922,265 B1 | * | 4/2011 | Cottrell, V | B60T 1/10 303/113.1 |
| 9,931,942 B2 | * | 4/2018 | Jeon | B60T 8/4081 |
| 9,981,542 B2 | * | 5/2018 | Oguri | B60W 20/12 |
| 11,634,033 B2 | * | 4/2023 | Huang | B60L 7/18 701/22 |
| 2005/0099146 A1 | * | 5/2005 | Nishikawa | B60L 7/18 318/63 |
| 2006/0102394 A1 | * | 5/2006 | Oliver | B60W 30/18127 180/65.265 |
| 2006/0196712 A1 | * | 9/2006 | Toyota | B60L 3/108 180/165 |
| 2008/0100129 A1 | * | 5/2008 | Lubbers | B60L 7/18 303/113.1 |

(Continued)

*Primary Examiner* — Phutthiwat Wongwian
*Assistant Examiner* — Sherman D Manley
(74) *Attorney, Agent, or Firm* — Lee & Hayes, P.C.

(57) ABSTRACT

Systems and techniques for determining deceleration controls to use in controlling a vehicle are described. A deceleration distribution system may receive a deceleration input from a vehicle control system or component and determine a rate of change of torque associated with adjusting current vehicle to torque to a torque associated with the deceleration input. The deceleration distribution system may then determine one or more deceleration components capable of achieving the determined rate of change and generate deceleration controls for such components to slow and/or stop the vehicle based on the received deceleration input.

20 Claims, 7 Drawing Sheets

(56) References Cited

U.S. PATENT DOCUMENTS

| | | | |
|---|---|---|---|
| 2012/0323430 A1* | 12/2012 | Nakamura | B60L 50/51 |
| | | | 701/22 |
| 2013/0173100 A1* | 7/2013 | Takagi | B60L 3/0061 |
| | | | 180/65.265 |
| 2013/0211688 A1* | 8/2013 | Oguri | G06F 17/00 |
| | | | 701/70 |
| 2013/0297134 A1* | 11/2013 | Saito | B60L 50/16 |
| | | | 701/22 |
| 2016/0264111 A1* | 9/2016 | Doi | B60T 8/267 |
| 2017/0015204 A1* | 1/2017 | Oguri | B60L 50/16 |
| 2017/0015323 A1* | 1/2017 | Oguri | B60W 10/08 |
| 2017/0021731 A1* | 1/2017 | Suzuki | B60T 8/1755 |
| 2019/0100204 A1* | 4/2019 | Plianos | B60W 30/18127 |
| 2020/0023817 A1* | 1/2020 | O'Meachair | G09B 19/167 |
| 2021/0170878 A1* | 6/2021 | Straßer | B60L 7/26 |
| 2021/0229646 A1* | 7/2021 | Kim | B60T 8/17551 |
| 2021/0237583 A1* | 8/2021 | Huang | F16D 61/00 |
| 2021/0284129 A1* | 9/2021 | Hori | B60L 15/2009 |
| 2023/0034858 A1* | 2/2023 | Gloceri | B60W 30/16 |
| 2023/0067494 A1* | 3/2023 | Westover | B60W 30/143 |
| 2023/0126354 A1* | 4/2023 | Kim | B60L 15/2009 |
| | | | 701/22 |
| 2023/0219429 A1* | 7/2023 | Yoshizawa | B60L 7/16 |
| | | | 318/139 |
| 2023/0223884 A1* | 7/2023 | Yoshizawa | B60L 15/007 |
| | | | 318/139 |
| 2023/0256956 A1* | 8/2023 | Oguro | B60W 10/08 |
| | | | 701/22 |
| 2023/0286393 A1* | 9/2023 | Takebayashi | B60L 15/20 |
| 2023/0347748 A1* | 11/2023 | Kurosawa | B60W 20/14 |
| 2024/0001774 A1* | 1/2024 | Jung | B60L 3/0046 |
| 2024/0075817 A1* | 3/2024 | Wang | B60T 13/686 |
| 2024/0123834 A1* | 4/2024 | Liu | B60L 7/14 |
| 2024/0351448 A1* | 10/2024 | Kamio | B60L 7/18 |

\* cited by examiner

TORQUE DISTRIBUTION-BASED DECELERATION

BACKGROUND

While a vehicle is operating, a vehicle operator or vehicle controller may issue a deceleration command, gauge the effect on the motion of the vehicle, and issue subsequent deceleration commands as needed to achieve a deceleration goal. However, this approach may result in overly rapid deceleration or insufficiently rapid deceleration, increasing the risk to the vehicle, vehicle passengers, and objects outside of the vehicle (e.g., pedestrians) and impacting passenger comfort. Maintaining passenger comfort and safety while continuing to safely operate a vehicle under deceleration conditions may, at times, present challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
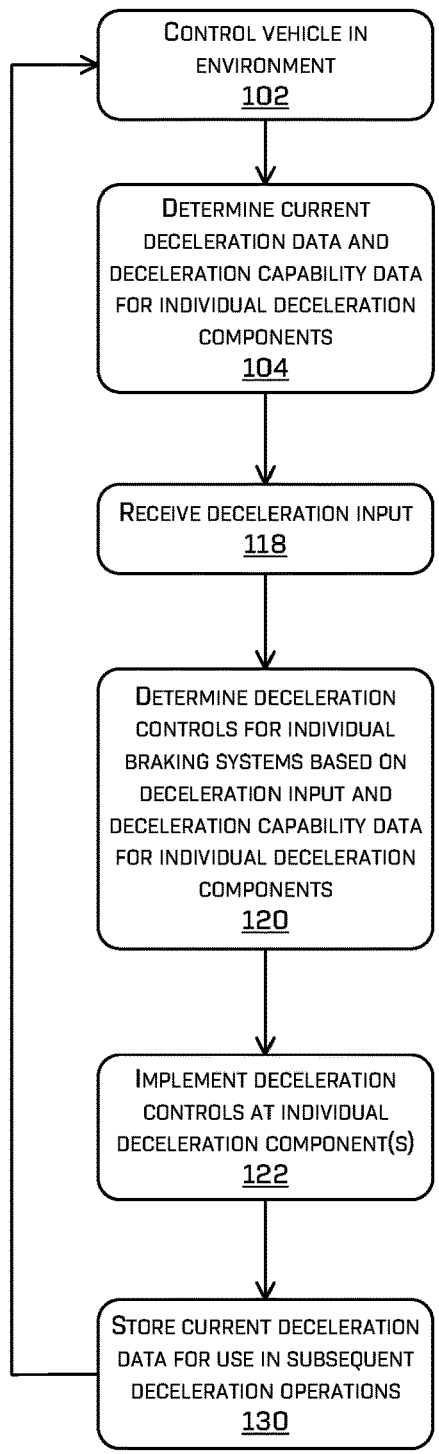
FIG. 1 illustrates an example process for determining and implementing torque distribution-based deceleration in a vehicle, in accordance with examples of the disclosure.
Figure 1:
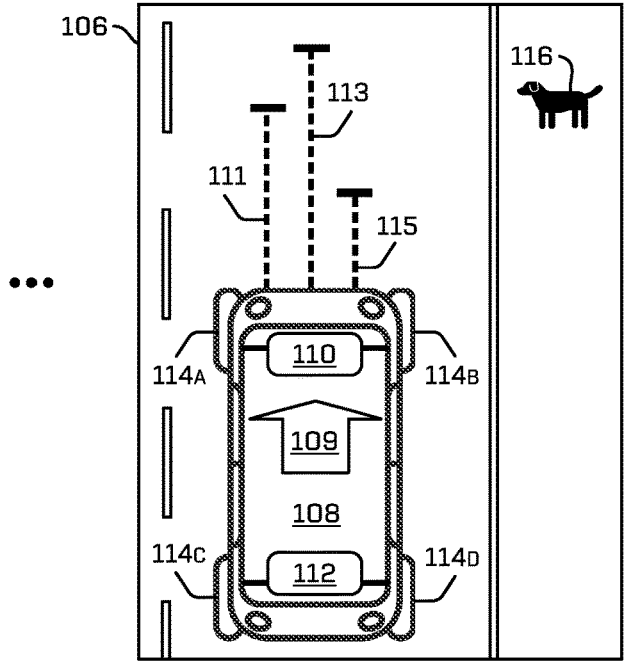
Figure 1:
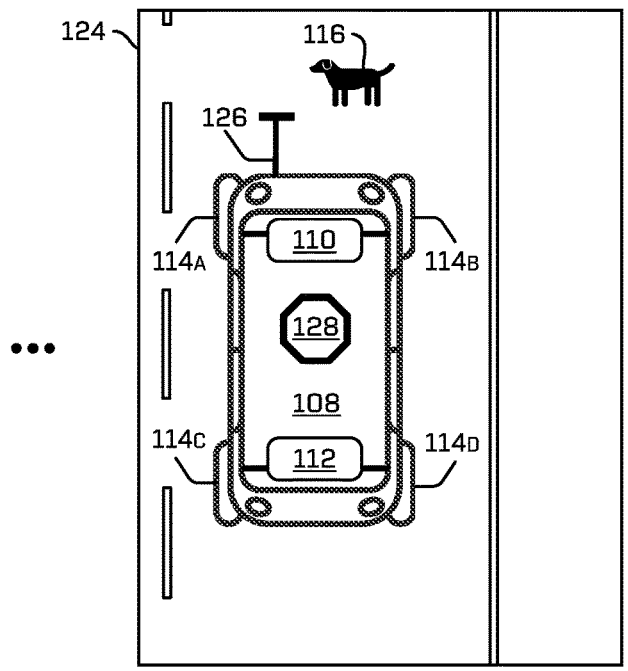

Modern electric and hybrid vehicles may be configured with one or more electric motors that may be capable of performing regenerative braking, where the electric motor may slow the vehicle and captures the kinetic energy from braking for use to, for example, charge the vehicle's battery. Such vehicles may also be configured with one or more friction braking systems (e.g., disk brakes) that may slow the vehicle by applying pressure to components of, or attached to, one or more of the vehicle's wheels (e.g., brake rotors), creating friction that reduces the rate of rotation of such wheels. The various techniques described herein may be used to determine appropriate deceleration commands for the different available deceleration components for particular situations. Systems and techniques for determining deceleration commands to apply at a vehicle to improve stopping ability, reduce component wear, and increase safety are discussed herein.

In various examples, a vehicle computing system may execute a deceleration distribution system that may determine deceleration commands for one or more of the deceleration components available at the vehicle at which the vehicle computing system is configured. The deceleration distribution system may receive input from a vehicle control component requesting the application of braking or deceleration to slow the vehicle. In response to this input, the deceleration distribution system may determine one or more kinematic values or properties, such as a rate of change of a kinematic property or value of a vehicle (e.g., a rate of change of torque, a rate of change of vehicle velocity, a rate of change of acceleration, etc.), that would be required to cause the vehicle to operate at the requested deceleration. The deceleration distribution system may then determine the deceleration components to control to implement the requested deceleration and/or the amount of braking pressure and/or activity to instruct such components to implement.

For example, a vehicle may be configured with two axles (e.g., four wheels) and two electric motors. An individual motor of the two motors may drive and decelerate, using regenerative braking, a corresponding individual axle of the two axles. The vehicle may also be configured with a friction braking system that may decelerate the vehicle using friction braking components configured at any one or more (including all) of the vehicle's wheels, such as disk brakes configured with rotors and brake pads. In the interest of reducing wear on the friction braking system and capturing kinetic energy from vehicle deceleration operations, the vehicle may be configured to use regenerative braking operations when the regenerative braking components are capable of adequately slowing or stopping the vehicle, while introducing friction braking operations when additional braking capabilities are warranted. The vehicle may be further configured to use a single regenerative braking component (e.g., one electric drive motor) when the single component is capable of adequately slowing or stopping the vehicle, while introducing the second component when additional braking capabilities are warranted.

In examples, a vehicle may be configured with any combination of braking components and/or systems that may be individually controllable. For example, individual friction braking components configured at individual wheels of a vehicle may be individually controllable (e.g., individual disk brakes may be configured at individual wheels and controlled independently of one another). Additionally or alternatively, individual regenerative braking components configured at individual wheels of a vehicle may be individually controllable (e.g., individual electric motors may be configured at individual wheels and controlled independently of one another). In other examples, braking components may be configured and/or controlled on a per-axle basis (e.g., one or more electric motors may be configured at a particular axle and controlled as a group for that axle, one or more disk brakes may be configured at a particular axle and controlled as a group for that axle, etc.). The disclosed systems and techniques may be implemented using any configuration and combination of braking components and/or systems and control techniques.

A deceleration distribution system may be configured at the vehicle to determine and implement specific deceleration commands at particular deceleration components based on deceleration input received from a vehicle control component. This vehicle control component may be a component of the vehicle computing system configured at the vehicle, a component configured at a remote vehicle control system in communication with the vehicle computing system, or a combination thereof. In examples, the vehicle control component may be a vehicle controller, velocity controller, a tracking component, a planning component, a collision avoidance system, a trajectory determination system, and/or any other system or components configured to provide deceleration requests, instructions, and/or data to a deceleration distribution system. In examples, the vehicle control component may have one or more manual driving components, such as a brake pedal component and/or module and/or an accelerator pedal component and/or module that may be operated by a human driver of the vehicle.

The deceleration input received from the vehicle control component may take a variety of forms. In examples, deceleration input may indicate a requested reduction in torque applied to the wheels of the vehicle (e.g., a relative or specific amount of torque reduction) and/or a specific requested amount of torque to be applied at the vehicle's wheels (e.g., that may be less than the currently applied torque, thereby resulting in deceleration, may be referred to as "overall vehicle torque"). Deceleration input may also, or instead, be a requested deceleration (e.g., a negative acceleration), such as a relative or specific amount of deceleration. Deceleration input may also, or instead, represent an overall system torque command indicating torque proportional to a current or requested longitudinal acceleration command. Any other data and/or values that may allow a deceleration distribution system or component to determine a rate of change of torque at the wheels of the vehicle and/or otherwise determine deceleration commands for one or more deceleration components may be used as deceleration input.

Using the deceleration input, the deceleration distribution system may determine a rate of change of torque required to implement the deceleration associated with the deceleration input. For example, the deceleration distribution system may store historical torque data (and/or data that may be used to determine historical torque data), including a current or most recently determined torque value (e.g., applied at or otherwise associated with the vehicle's wheels). The deceleration distribution system may, in response to receiving the deceleration input, determine a requested torque value based on the deceleration input (e.g., based on a requested torque explicitly indicated in the deceleration input and/or based on a torque value calculated using data represented by the deceleration input). The deceleration distribution system may then determine a rate of change torque based on the current torque value and the requested torque value (e.g., the rate of change of torque required to change the torque applied at the vehicle's wheels from the current torque to the requested torque).

The deceleration distribution system may use the determined rate of change of torque to determine one or more deceleration components and/or one or more deceleration commands or controls. A deceleration component may have a limit on its achievable torque and/or rate of change of torque. Thus, the determined rate of change of torque may or may not be achievable using a particular deceleration component. For example, a single electric motor configured at the vehicle may be capable of a maximum rate of change of torque of 20 Newton-meters per second (Nm/s). The two electric motors configured at the vehicle may be capable of performing regenerative braking to achieve a maximum rate of change of torque of 40 Nm/s. To achieve rates of change of torque greater than 40 Nm/s, the vehicle may require the use of the friction braking components. In various examples, rather than, or in addition to, maximum achievable torque and/or rate of change of torque, the deceleration distribution system may use average achievable torque and/or rate of change of torque and/or other torques and rates of change of torque for determining deceleration components.

The deceleration distribution system may determine a range of rates of change of torque within which the determined rate of change of torque falls. The deceleration distribution system may then determine the particular deceleration components associated with that range of rates of change of torque. The deceleration distribution system may then determine the particular commands to be transmitted to those deceleration components to implement the determined rate of change of torque and, ultimately, the requested torque. For example, based on determining the particular deceleration components for the range of rates of change of torque associated with the determined rate of change of torque (e.g., any combination of a first electric motor, a second electric motor, and a friction braking system), the deceleration distribution system may determine the amount of braking pressure and/or regenerative braking to apply at the determined component(s). For instance, the deceleration distribution system may determine that, to achieve the requested torque, the leading axle electric motor may engage 100% of its regenerative braking capabilities, the trailing axle electric motor may engage 75% of its regenerative braking capabilities, and the friction braking system may apply 25% of its available brake pressure (e.g., apply 25% of available brake pressure at the individual friction braking components).

Alternatively or additionally, friction braking may also be selectively distributed. For instance, the deceleration distribution system may determine that, to achieve the requested torque (e.g., in addition to engaging regenerative braking capabilities), a leading axle friction braking system may apply 25% of its available brake pressure and a trailing axle friction braking system may apply 50% of its available brake pressure. In another example, the deceleration distribution system may determine that, to achieve the requested torque (e.g., in addition to engaging regenerative braking capabilities), a driver's side leading axle friction braking system may apply 25% of its available brake pressure, a passenger's side leading axle friction braking system may apply 35% of its available brake pressure, a driver's side trailing axle friction braking system may apply 45% of its available brake pressure, a passenger's side trailing axle friction braking system may apply 55% of its available brake pressure. Such configurations may be implemented when a difference in traction is detected between two or more wheels and/or between axles (e.g., determining to use lower braking pressure at wheels more likely to experience a loss of traction to prevent wheel lock).

In examples, ranges of rates of change of torque may be based on component capabilities and component preferences. For instance, a vehicle configured with a deceleration distribution system may have a leading axle electric motor capable of regenerative braking, a trailing axle electric motor capable of regenerative braking, and a friction braking system. The deceleration distribution system may be configured to prefer, for braking, the leading axle electric motor, then the combination of the leading axle electric motor and the trailing axle electric motor, and lastly the combination of all three of the leading axle electric motor, the trailing axle electric motor, and friction braking system. The deceleration distribution system may be configured with and/or determine a range of rates of change of torque for the leading axle electric motor individually of between 0 and 20 Nm/s. The deceleration distribution system may further be configured with and/or determine a range of rates of change of torque for the combination of the leading axle electric motor and the trailing axle electric motor of between 20 and 40 Nm/s. Finally, the deceleration distribution system may also be configured with and/or determine a range of rates of change of torque for the combination of the leading axle electric motor, the trailing axle electric motor, and the friction braking system of any rate of change of torque greater than 40 Nm/s. In this example, the deceleration distribution system may control (e.g., only) the leading axle electric motor to implement rates of change of torque between 0 and 20 Nm/s. Further in this example, the deceleration distribution system may control both the leading axle electric motor and the trailing axle electric motor (e.g., excluding the friction braking system) to implement rates of change of torque between 20 and 40 Nm/s. Also in this example, the deceleration distribution system may control all three of the leading axle electric motor, the trailing axle electric motor, and the friction braking system to implement rates of change of torque greater than 40 Nm/s.

In examples, deceleration components may be controlled at any level of granularity. For example, vehicles may be configured with electric motors at individual wheels (e.g., one at each of four wheels, one at each wheel of one axle of a two-axle vehicle, etc.) In such configurations, a deceleration distribution system may use deceleration capability data (e.g., achievable torque and/or achievable rate of change of torque) for the individual motors to determine deceleration controls. Such deceleration controls may be determined for individual motors. Similarly, friction braking system components may be individually controllable. For example, a four-wheeled vehicle may be equipped with a disk brake at each of its four wheels. Such individual disk brakes may be independently controllable and considered individual friction braking components. Alternatively, deceleration components, such as friction braking components, associated with an individual axle may be considered individual friction braking components (e.g., the friction braking components associated with a particular axle may be considered an individual deceleration component). In such configurations, a deceleration distribution system may use deceleration capability data (e.g., achievable torque and/or achievable rate of change of torque) for the individual disk brakes or other individual deceleration components (or components associated with an individual axle) to determine individual deceleration controls for such individual components. Any number and/or combination of deceleration components that may be controllable individually or in any grouping are contemplated.

Various conditions and/or parameters may be used to determine deceleration component capabilities and/or commands. For example, achievable torque and/or rate of change of torque for a particular component may be preconfigured at the deceleration distribution system and/or obtained or accessed by the deceleration distribution system. Alternatively or additionally, the deceleration distribution system may receive or obtain data that it may use to dynamically adjust or determine an achievable torque and/or rate of change of torque value for a deceleration component.

For example, conditions in an environment may impact the braking performance of a friction braking component or a regenerative braking component. The deceleration distribution system may receive environment data (e.g., weather data such as precipitation, temperature, etc.) via the vehicle computing system (e.g., originating at one or more sensors configured at the vehicle, from a remote weather system, etc.) that it may use to adjust or determine an achievable torque and/or rate of change of torque value for a deceleration component. For example, in dry conditions, a deceleration distribution system may determine a higher achievable rate of change of torque for a particular deceleration component than the deceleration distribution system may determine for the particular deceleration component in wet or icy conditions.

Alternatively or additionally, equipment conditions of various components configured at the vehicle may impact the braking performance of a friction braking component or a regenerative braking component. The deceleration distribution system may receive equipment and/or other vehicle data (e.g., brake pad wear, rotor wear, tire wear, vehicle velocity, wheel traction, etc.) via the vehicle computing system (e.g., originating at one or more sensors configured at the vehicle, from a remote vehicle data system, etc.) that it may use to adjust or determine an achievable torque and/or rate of change of torque value for a deceleration component. Vehicle conditions such as load and/or weight distribution may also, or instead, impact the braking performance of a friction braking component or a regenerative braking component and may be used by the deceleration distribution system to adjust or determine an achievable torque and/or rate of change of torque value for a deceleration component. For example, for one or more wheels experiencing reduced traction, a deceleration distribution system may determine a lower achievable rate of change of torque for the particular deceleration components at such wheels than the deceleration distribution system may determine for the particular deceleration components when the associated wheels are experiencing normal or increased traction.

The systems and techniques described herein may be directed to leveraging torque data, deceleration component capability data and/or other parameters, deceleration input, and other data to enable a vehicle, such as an autonomous vehicle, to more accurately determine deceleration controls for improved vehicle control and operational safety, facilitating safer navigation through an environment and improved vehicle control in during the implementation of vehicle deceleration. In particular examples, the systems and techniques described herein can utilize data structures containing data representing deceleration component capability data, environmental and/or vehicle conditions, torque and rate of change of torque data, and/or any other associated data. By using the deceleration distribution techniques described herein to more accurately determine deceleration controls that may be used in operating a vehicle (e.g., using an operational trajectory), the examples described herein may result in increased safety and accuracy of vehicle control, especially vehicle stopping operations, thereby allowing an autonomous vehicle to more safely operate in an environment. For example, the techniques described herein may be faster and/or more robust than conventional techniques, as they may increase the ability of an autonomous vehicle to safely navigate in an environment and more smoothly implement deceleration operations to reach a stopping point (which may, in turn, provide more comfortable rider experiences while ensuring safe operation of the vehicle). That is, the techniques described herein provide a technological improvement over existing vehicle trajectory and deceleration control determination technology.

The techniques described herein may also improve the operation of computing systems and increase resource utilization efficiency. For example, computing systems, such as vehicle computing systems, may more efficiently perform distributed deceleration control determinations using the techniques described herein because the disclosed examples may reduce the amount of data needed to generate such controls (e.g., by determining fewer, more accurate deceleration controls and applying such controls to more suitable deceleration components) and reduce the amount of processing required to determine deceleration controls by reducing repeated, less accurate, deceleration control determinations. Furthermore, computing systems, such as vehicle computing systems, may more efficiently perform trajectory and deceleration distribution operations and the calculations required to determine an operational trajectory by maintaining and updating deceleration data to determine more effective deceleration controls, thereby requiring less processing to determine an operational trajectory than would be required using conventional techniques where a less accurate deceleration controls may be generated in response to deceleration input.

The techniques described herein may also improve the durability of vehicle components, reduce wear and maintenance costs for such components, and improve the efficiency of vehicle operations by increasing the use of more durable deceleration components and reducing the wear on less durable deceleration components, while harvesting energy that may otherwise be wasted for use in battery charging. For example, computing systems, such as vehicle computing systems executing a deceleration distribution component or system as described herein, may divert braking operations to regenerative deceleration components that may not wear as quickly and otherwise may be more durable than friction deceleration components. Increasing the use of regenerative deceleration components may also reduce charging costs by capturing kinetic energy that may otherwise be lost for use in charging the vehicle's batteries. These aspects reduce maintenance costs and help to maintain the vehicle in an improved condition for a longer period of time, thereby increasing passenger safety and comfort.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, a braking assistance system configured at a manually operated vehicle (e.g., brake assist (BA), brake assist system (BAS), automatic emergency braking (AEB), autonomous emergency braking, advanced driver assistance system (ADAS), etc.) and are not limited to autonomous vehicles. In another example, the techniques can be utilized in an aviation or nautical context, or in any system involving vehicle trajectories, deceleration controls, and/or deceleration component distribution determination operations. Further, although aspects of the disclosed systems and techniques may be discussed in the context of originating with particular types of sensor data and processing with particular types of components, data, and data structures as described herein can include any two-dimensional, three-dimensional, or multi-dimensional data and data associated with any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like), or any combination thereof.

Figure 2:
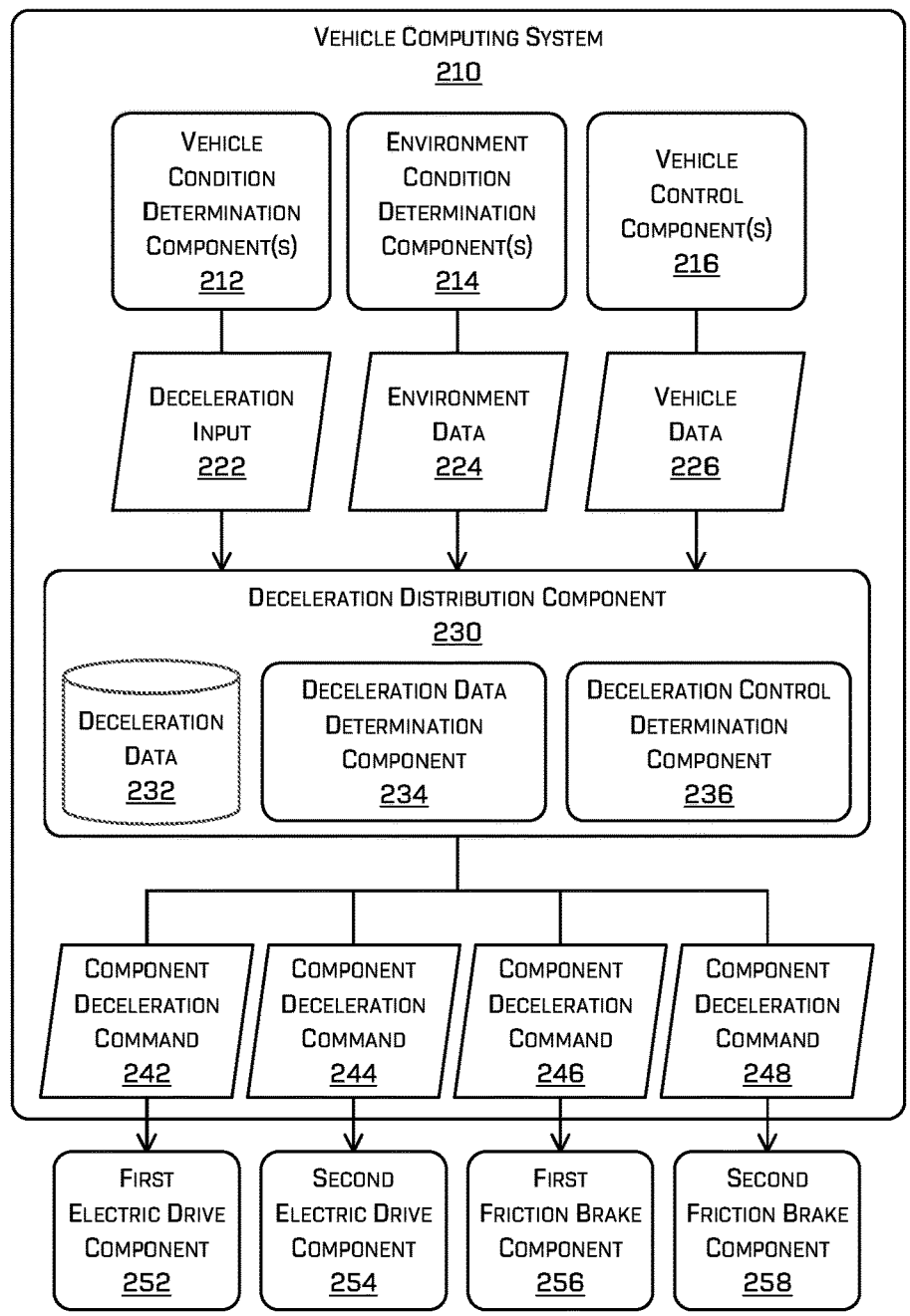
FIG. 2 is a block diagram of an example vehicle computing system, including a deceleration distribution system, in accordance with examples of the disclosure.
Figure 4A:
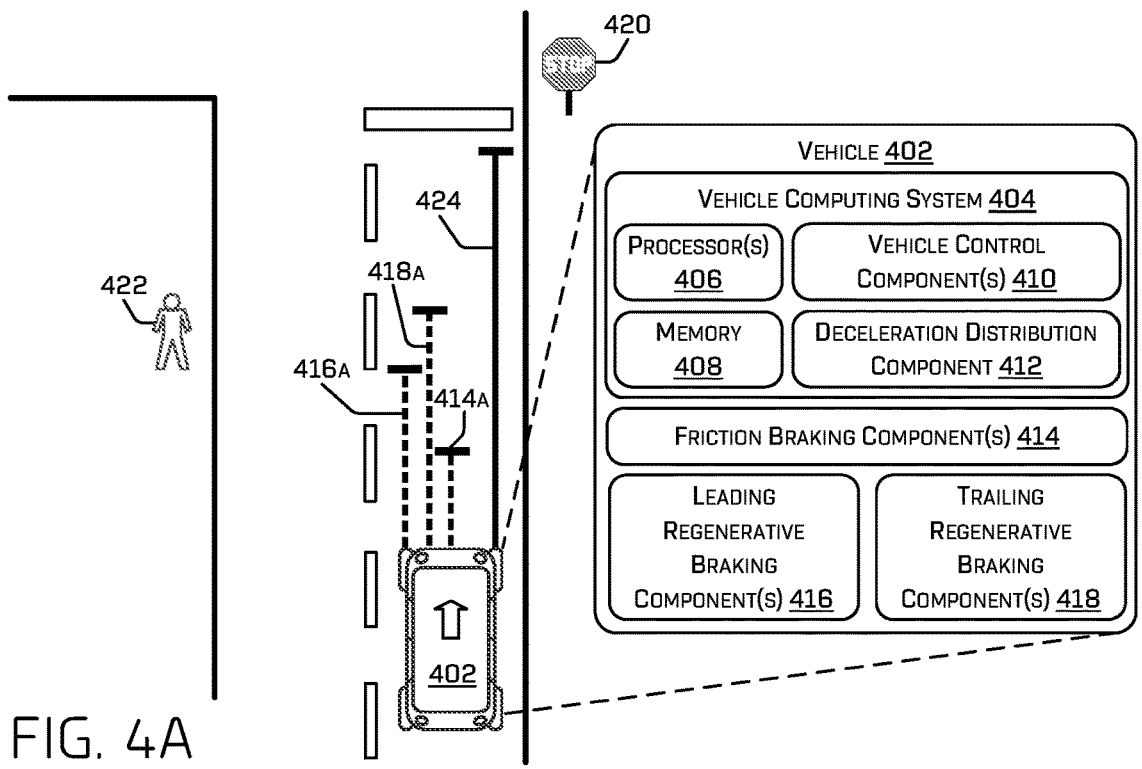
FIGS. 4A-B depict block diagrams representing an example vehicle, environment, braking capabilities, and deceleration commands, in accordance with examples of the disclosure.
Figure 4B:
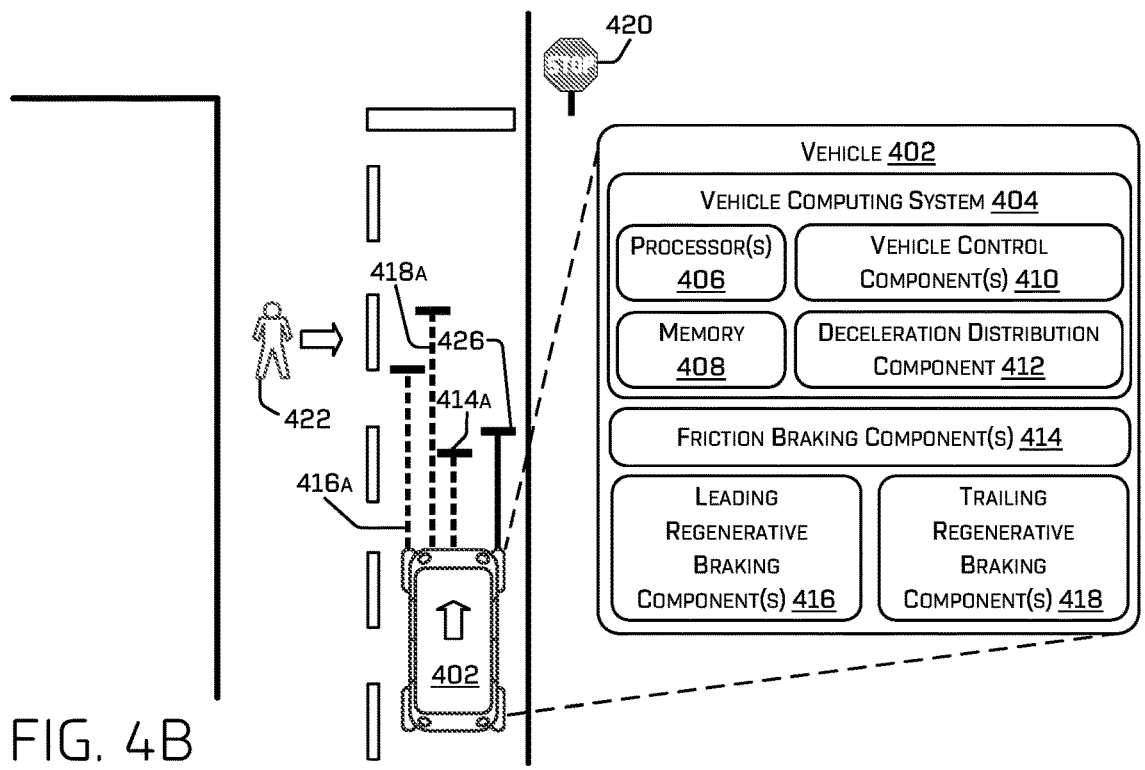
Figure 7:
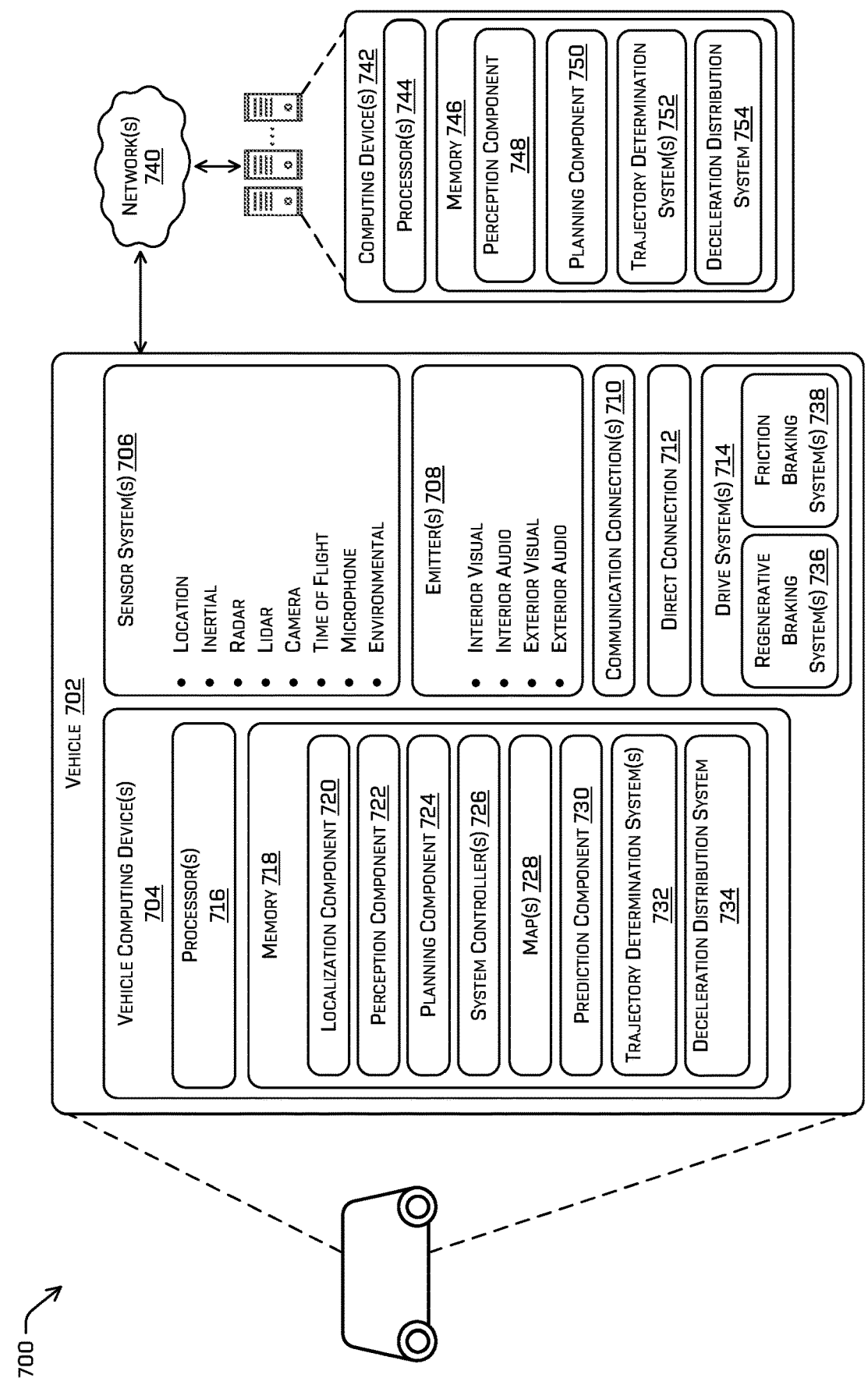
FIG. 7 depicts a block diagram of an example system for implementing the techniques described herein.

FIG. 1 is a pictorial flow diagram of an example process 100 for determining deceleration controls for use in controlling a vehicle operating in an environment. In examples, one or more operations of the process 100 may be implemented by a vehicle computing system, such as by using one or more of the components and systems illustrated in FIGS. 2, 4, and 7 and described below. For example, one or more components and systems can include those associated with deceleration distribution system 200 illustrated in FIG. 2, vehicle computing system 404 illustrated in FIGS. 4A-B, and/or processors 716 and/or 744, memories 718 and/or 746, trajectory determination system(s) 732, and/or deceleration distribution system 734 illustrated in FIG. 7. In examples, the one or more operations of the process 100 may be performed by a remote system in communication with a vehicle, such as trajectory determination system 752 and/or deceleration distribution system 754 illustrated in FIG. 7. In still other examples, the one or more operations of the process 100 may be performed by a combination of a remote system and a vehicle computing system. However, the process 100 is not limited to being performed by such components and systems, and the components and systems of FIGS. 2, 4, and 7 are not limited to performing the process 100.

At operation 102, a vehicle computing system may control a vehicle in an environment. In examples, the vehicle computing system may be autonomously controlling the vehicle in the environment. Alternatively, the vehicle computing system may be partially controlling or assisting in control of a vehicle that may be substantially manually controlled (e.g., by an onboard driver and/or remotely). The vehicle may be configured with one or more regenerative braking components and one or more friction braking components. The vehicle computing system may be configured with a deceleration distribution system as described herein that may be configured to control the deceleration components configured at the vehicle.

At operation 104, the deceleration distribution system may determine current deceleration data for the vehicle and deceleration capability data for the individual deceleration components configured at the vehicle. For example, the deceleration distribution system may determine a current torque for the vehicle. The deceleration distribution system may further determine an achievable rate of change of torque and/or an achievable torque for the individual deceleration components configured at the vehicle. Such deceleration data may be configured at and/or updated (e.g., substantially continuously) by the vehicle computing system and/or the deceleration distribution system for relatively immediate use in response to receiving a deceleration command. Alternatively or additionally, the deceleration distribution system may access or retrieve such data as needed in response to receiving a deceleration command.

An example 106 illustrates a top-down view of an environment in which a vehicle 108 may be traveling. The vehicle 108 may be traveling in the direction indicated by direction arrow 109. The vehicle 108 may be configured with a first electric motor 110 configured at a leading axle of the vehicle 108 and a second electric motor 112 configured at a trailing axle of the vehicle 108. The electric motors 110 and 112 may be configured to perform regenerative braking and therefore may also be referred to as deceleration components 110 and 112, respectively. The vehicle 108 may be further configured with friction braking component 114, which may include individual disk brakes 114a-d (e.g., individual disk brakes configured at the individual wheels of vehicle 108, which may be a four-wheeled vehicle), and which may also be referred to a deceleration component 114. There may be one or more objects in the environment of example 106, such as object 116 (e.g., a dog).

A deceleration distribution system may be configured at the vehicle 108. The deceleration distribution system may determine a current direction (as represented by arrow 109)

and associated torque for the vehicle 108. The deceleration distribution system may further determine achievable torque values and/or achievable rate of change of torque values for the individual deceleration components 110, 112, and 114. The distances 111, 113, and 115 illustrated in this example may be the shortest distances achievable using an individual deceleration component of the vehicle 108 to bring the vehicle 108 to a stop based on the current torque and direction of the vehicle 108 and the achievable rates of change of torque for the respective individual deceleration components.

For example, the distance 111 may represent the distance to bring the vehicle 108 from its current velocity to a stop using (e.g., only) the regenerative braking capabilities of the first electric motor 110. For instance, the distance 111 may represent the distance to bring the vehicle 108 to a stop by reducing the torque at (e.g., only) the first electric motor 110 at its (e.g., maximum) achievable rate of change of torque until the velocity of the vehicle 108 is zero. Similarly, the distance 113 may represent the distance to bring the vehicle 108 from its current velocity to a stop using (e.g., only) the regenerative braking capabilities of the second electric motor 112; that is, the distance 111 may represent the distance to bring the vehicle 108 to a stop by reducing the torque at (e.g., only) the second electric motor 112 at its (e.g., maximum) achievable rate of change of torque until the velocity of the vehicle 108 is zero.

The distance 115 represents a corresponding distance to bring the vehicle 108 from its current velocity to a stop using (e.g., only) the friction braking capabilities of the friction braking component 114. For instance, the distance 115 may represent the distance to bring the vehicle 108 to a stop by reducing the torque at (e.g., only) the friction braking component 114 at its (e.g., maximum) achievable rate of change of torque until the velocity of the vehicle 108 is zero.

At operation 118, deceleration input may be received at the deceleration distribution system. For example, the deceleration distribution system may receive a deceleration command from a vehicle control component or system (e.g., a vehicle controller, vehicle computing system, manual braking system (e.g., in response to a driver pressing a brake pedal), a braking assistance system configured at a manually operated vehicle and responding to a driver pressing a brake pedal, etc.). This deceleration input may indicate a requested (e.g., relative or specific) reduction in velocity and/or torque, a requested specific (e.g., overall vehicle) velocity and/or torque, and/or a specific type of deceleration request, such as "full stop" or "emergency stop" that may be associated with, for example, full application of all braking capabilities and/or an application of another particular level of braking capabilities.

At operation 120, the deceleration distribution system may determine, based on the deceleration input and the deceleration capability data for the individual deceleration components configured at the vehicle, one or more deceleration controls for the individual deceleration components of the vehicle. For example, the deceleration distribution system may determine a rate of change of torque required to implement the deceleration associated with the deceleration input (e.g., change vehicle to torque from its current torque to torque associated with or indicated by the deceleration input). Using the deceleration capability data for the deceleration components (e.g., achievable rates of change of torque), the deceleration distribution system may then determine the particular deceleration components that may be used to implement the change in overall vehicle torque.

For example, the deceleration distribution system may determine ranges of rates of change of torque for various combinations of deceleration components based on the achievable rates of change of torque for the individual deceleration components. The deceleration distribution system may then determine a particular range of rates of change of torque within which the rate of change of torque required to implement the deceleration associated with the deceleration input falls. The deceleration distribution system may determine the deceleration components associated with this particular range of rates of change of torque. The deceleration distribution system may then determine the particular controls for those deceleration components to implement the determined rate of change of torque. For example, based on determining the particular deceleration components for the range of rates of change of torque associated with the determined rate of change of torque (e.g., any combination of deceleration components), the deceleration distribution system may determine the amount of braking pressure and/or regenerative braking to apply at the determined component(s). The deceleration distribution system may then generate individual deceleration controls for these particular deceleration components.

At operation 122, the deceleration distribution system may implement the determined deceleration controls at the determined deceleration components. For example, the deceleration distribution system may transmit one or more commands to individual deceleration components that may cause such components to implement the determined deceleration controls.

An example 124 illustrates a top-down view of the environment of the example 106 in which a vehicle 108 may be traveling. In the example, the deceleration distribution system of the vehicle 108 may have received a "full stop" deceleration command from the vehicle computing system, an onboard driver, a remote operator, and/or another vehicle controller. For instance, the deceleration command may have been generated by the vehicle computing system in response to detecting, via sensors configured at the vehicle 108, that the object (dog) 116 has entered the roadway in front of the vehicle 108.

The deceleration distribution system may have determined, based on the deceleration capabilities (e.g., achievable torque values and/or achievable rate of change of torque values) of the deceleration components 110, 112, and 114, to simultaneously activate multiple of the individual deceleration components 110, 112, and 114 to bring the vehicle 108 to a stop within the distance 126 shown in this example. As shown here, the distance 126 is shorter than any one of the distances 111, 113, and 115 illustrated in the example 106. Thus, in order to stop in a shorter distance than the stopping distances possible using individual deceleration components, the deceleration distribution system may have (e.g., simultaneously) controlled two or more of the deceleration components 110, 112, and 114 to stop the vehicle or otherwise reduce the vehicle to substantially zero velocity 128.

At operation 130, the deceleration distribution system may store current deceleration data, such as the current torque and/or data that may be used to determine the current torque, following implementation of the deceleration controls at operation 122. The deceleration distribution system may use this data in future deceleration operations, for example, to determine a rate of change of torque required to implement a deceleration command or otherwise adjust a vehicle velocity based on received deceleration input.

FIG. 2 is a block diagram of a deceleration distribution system 200 according to various examples. The system 200 may be implemented at a vehicle (e.g., an autonomous vehicle) by a vehicle computing system and/or by a remote system. The system 200 may include one or more of the components and systems illustrated in FIGS. 4 and 7 and described below. These components may be configured as described herein or in any other configuration and may perform any subset of their associated operations in any or and/or in conjunction with one or more other operations. For example, one or more components and systems can include and/or be implemented using vehicle computing system 404 illustrated in FIGS. 4A-B and/or processors 716 and/or 744, memories 718 and/or 746, trajectory determination system (s) 732, and/or deceleration distribution system 734 illustrated in FIG. 7. In some examples, one or more operations performed by the system 200 may be implemented as a combination of components at a remote system in communication with a vehicle, such as trajectory determination system 752 and/or deceleration distribution system 754 illustrated in FIG. 7. However, the system 200 is not limited to being performed by such components and systems, and the components and systems of FIGS. 4 and 7 are not limited to implementing the system 200.

In various examples, a deceleration distribution system 200 may be configured at a vehicle that may be configured with a vehicle computing system 210. The vehicle computing system 210 may be configured to autonomously control the vehicle, assist in controlling the vehicle, facilitate remote control of the vehicle, and/or facilitate manual control of the vehicle by an onboard driver. Such vehicle control may be performed by one or more vehicle control components 212 that may generate and provide deceleration input 222 to a deceleration distribution component 230. As described herein, deceleration input, such as deceleration input 222, may indicate a requested (e.g., relative or specific) reduction in velocity and/or torque, a requested specific (e.g., overall vehicle) velocity and/or torque, a specific or relative level application of braking capabilities, etc.

The vehicle computing system 210 may further be configured with an environment condition determination component 214 that may determine conditions within an environment in which the vehicle may be operating. For example, the vehicle may be configured with one or more sensors (e.g., cameras, lidar, radar, sonar, time-of-flight, and the like) that may capture and/or generate sensor data representative of environmental conditions (e.g., weather conditions, road condition, etc.) and/or may receive such information from a remote source. The vehicle computing system 210 may be configured to generate environmental condition data based on such sensor data. The environment condition determination component 214 may use such environmental condition data to generate environment data 224 that may be provided to the deceleration distribution component 230 for use in deceleration distribution operations.

The vehicle computing system 210 may further be configured with vehicle condition determination component 216 that may determine conditions associated with the vehicle and/or its associated components. For example, the vehicle may be configured with one or more vehicle sensors (e.g., load sensor, tire pressure sensor, brake pad wear sensor, brake rotor wear sensor, brake fluid pressure and/or temperature sensor, electric motor wear sensor, vehicle velocity (e.g., current vehicle velocity), etc.) that may capture and/or generate sensor data representative of vehicle conditions. In some examples, environmental sensors may also be used to generate vehicle condition data (e.g., cameras that capture images of tires that may then be used to determine tire conditions). The vehicle may also, or instead, be configured with one or more components that may generate and provide component condition data (e.g., vehicle mileage data, duration of operation, tire mileage data, mileage/time since last brake service, mileage/time since last motor service, etc.). The vehicle computing system 210 may be configured to generate vehicle condition data based on such sensor and/or other condition data. The environment condition determination component 214 may use such environmental condition data to generate vehicle data 226 that may be provided to the deceleration distribution component 230 for use in deceleration distribution operations.

The deceleration distribution component 230 may be configured with deceleration data store 232 that may store deceleration data that may be used to perform deceleration distribution operations. Such data may include current and/or historical torque, velocity, acceleration, and/or condition data, as well as any other data that may be used for deceleration distribution operations.

The deceleration distribution component 230 may be configured with a deceleration data determination component 234 that may be configured to determine deceleration data that may be used to generate deceleration controls. For example, the deceleration data determination component 234 may receive the deceleration input 222 and determine, using current deceleration data from the deceleration data store 232, the rate of change of torque needed to adjust the vehicle torque from its current torque to the torque associated with or indicated by the deceleration input 222. The deceleration data determination component 234 may provide this determined rate of change of torque and/or other deceleration data (e.g., based on the deceleration input 222) to a deceleration control determination component 236 configured at the deceleration distribution component 230.

The deceleration control determination component 236 may use the rate of change of torque and/or other deceleration data received from the deceleration control data determination component 234 to determine controls for the available deceleration components configured at the vehicle. The deceleration components included or otherwise associated with the exemplary deceleration distribution system 200 may include a first electric drive component 252 (e.g., configured at a first axle or wheel of the vehicle) capable of regeneration braking, a second electric drive component 254 (e.g., configured at a second axle or wheel of the vehicle) capable of regeneration braking, a first friction brake component 256 (e.g., configured at the first axle or wheel of the vehicle), and/or a second friction brake component 258 (e.g., configured at the second axle or wheel of the vehicle). However, other types and numbers of deceleration components may be used with the systems and techniques described herein.

The deceleration control determination component 236 may determine achievable rates of change of torque for the individual deceleration components 252, 254, 256, and 258, for example, based on stored and/or configured rates of change of torque for such components (e.g., stored in deceleration data store 232). The deceleration control determination component 236 may also, or instead, determine achievable ranges of rates of change of torque for various combinations of the deceleration components 252, 254, 256, and 258 based on the achievable rates of change of torque for the individual deceleration components. In determining achievable rates of change of torque for the individual deceleration components and/or combinations thereof, the deceleration control determination component 236 may use environment data 224 and/or vehicle data 226. For example, the deceleration control determination component 236 may perform one or more operations that may adjust an achievable rate of change of torque for a particular deceleration component based on current environmental weather conditions and/or component wear conditions for the particular deceleration component.

The deceleration control determination component 236 may also, or instead, determine a distribution of braking component application based on environment data 224 and/or vehicle data 226. For example, if the environment data 224 indicates that the road surface may be wet or icy, the deceleration control determination component 236 may determine a different distribution of braking application than if the environment data 224 indicates that the road surface may be dry (e.g., using applying more braking pressure at trailing axle braking component in wet conditions than in dry conditions to attempt to avoid wheel lock). In another example, if the vehicle data 226 indicates that particular wheels may have lower traction than others (e.g., one or more wheels on ice), the deceleration control determination component 236 may determine a different distribution of braking application than if the vehicle data 226 indicates that all wheels have similar traction (e.g., using applying more braking pressure at braking components configured at wheels with higher traction than applied at braking components configured at wheels with relatively lower traction to attempt to avoid wheel lock).

The deceleration control determination component 236 may determine a particular range of rates of change of torque determined for the various combinations of the deceleration components 252, 254, 256, and 258 within which the rate of change of torque required to implement the deceleration associated with the deceleration input 222 falls. The deceleration control determination component 236 may then determine the particular deceleration components associated with this range of rates of change of torque. The deceleration control determination component 236 may determine the particular controls for those deceleration components to implement the determined rate of change of torque. For example, the deceleration control determination component 236 may determine that, in order to adjust the torque of the vehicle from a current torque to a torque represented by the deceleration input 222, individual deceleration controls may be implemented at the individual deceleration components 252, 254, 256, and 258.

To implement such controls, the deceleration control determination component 236 may generate component deceleration commands 242, 244, 246, and/or 248. The deceleration control determination component 236 may transmit or otherwise communicate component deceleration commands 242, 244, 246, and/or 248 to the individual deceleration components 252, 254, 256, and 258, respectively.

Figure 3:
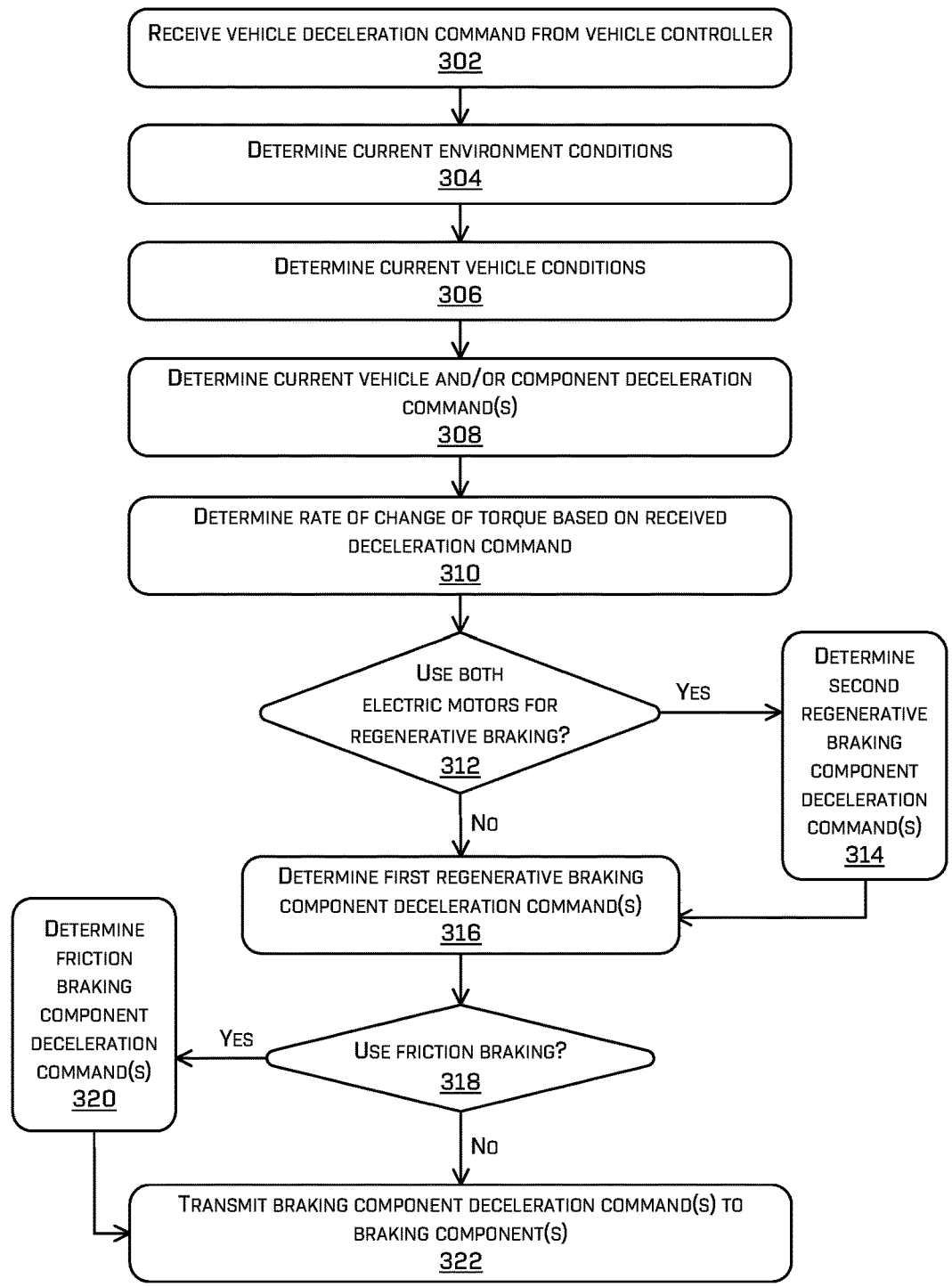
FIG. 3 illustrates an example process for determining and implementing deceleration commands in a vehicle, in accordance with examples of the disclosure.

FIG. 3 is a pictorial flow diagram of an example process 300 for determining deceleration controls for use in controlling a vehicle operating in an environment. In examples, one or more operations of the process 300 may be implemented by a vehicle computing system, such as by using one or more of the components and systems illustrated in FIGS. 2, 4, and 7 and described herein. For example, one or more components and systems can include those associated with deceleration distribution system 200 illustrated in FIG. 2, vehicle computing system 404 illustrated in FIGS. 4A-B, and/or processors 716 and/or 744, memories 718 and/or 746, trajectory determination system(s) 732, and/or deceleration distribution system 734 illustrated in FIG. 7. In examples, the one or more operations of the process 300 may be performed by a remote system in communication with a vehicle, such as trajectory determination system 752 and/or deceleration distribution system 754 illustrated in FIG. 7. In still other examples, the one or more operations of the process 300 may be performed by a combination of a remote system and a vehicle computing systems. However, the process 300 is not limited to being performed by such components and systems, and the components and systems of FIGS. 2, 4, and 7 are not limited to performing the process 300.

The exemplary process 300 is described as being performed by a deceleration distribution system configured at a vehicle that is configured with two regenerative braking deceleration components (e.g., one per axle of a two-axle vehicle) and one friction braking deceleration component, but, as will be appreciated, the process 300 may be implemented by a deceleration distribution system configured at any type of vehicle with any type and number of deceleration components.

At operation 302, the deceleration distribution system may receive a deceleration command from a vehicle controller. This may include or represent any type of deceleration input that indicates a requested (e.g., relative or specific) reduction in velocity and/or torque, a requested specific (e.g., overall vehicle) velocity and/or torque, a specific or relative level application of braking capabilities, etc.

At operation 304, the deceleration distribution system may determine current environment conditions for the environment in which the vehicle at which the deceleration distribution system is configured may be operating. For example, the deceleration distribution system may receive, obtain, or otherwise access weather conditions, road conditions, etc., from a vehicle computing system and/or one or more other systems or components.

At operation 306, the deceleration distribution system may determine current vehicle conditions for the vehicle at which the deceleration distribution system is configured and/or for components configured at such a vehicle. For example, the deceleration distribution system may receive, obtain, or otherwise access component wear data, vehicle load data, etc., from a vehicle computing system and/or one or more other systems or components.

At operation 308, the deceleration distribution system may determine current deceleration data for the vehicle and/or one or more deceleration components. For example, at this operation, the deceleration distribution system may determine a current (e.g., overall) acceleration, velocity, and/or torque of the vehicle and/or for one or more of the deceleration components configured at the vehicle. Also, or instead, at this operation, the deceleration distribution system may determine an achievable (e.g., maximum achievable) torque and/or an achievable (e.g., maximum achievable) rate of change of torque for the individual deceleration components configured at the vehicle. Also, or instead, at this operation, the deceleration distribution system may determine an achievable (e.g., maximum achievable) torque and/or an achievable (e.g., maximum achievable) rate of change of torque for various combinations of the individual deceleration components configured at the vehicle. The deceleration distribution system may also, or instead, at operation 308, determine ranges of rates of change of torque for the individual deceleration components configured at the vehicle and/or for various combinations thereof based on the achievable torque and/or achievable rate of change of torque for the individual deceleration components.

At operation 310, the deceleration distribution system may determine a rate of change of torque to be implemented at the vehicle to adjust the overall vehicle torque from its current torque to the torque associated with or indicated by the deceleration command received at operation 302. For example, the deceleration distribution system may use the current overall torque for the vehicle determined at operation 308 and the requested overall vehicle torque determined based on the deceleration command received at operation 302 to determine the rate of change of torque.

At operation 312, the deceleration distribution system may determine whether to use both of the two available electric motors at the vehicle for regenerative braking. For example, the deceleration distribution system may determine whether the rate of change of torque (e.g., determined at operation 310) to be implemented falls within a range of rates of change of torque (e.g., where such ranges may be determined at operation 308) associated with one or both of the electric motors that may be available for regenerative braking. If the rate of change of torque is associated with a range of rates of change of torque associated with both motors, at operation 314, the deceleration distribution system may generate one or more deceleration controls for a second of the two available electric motors. The deceleration distribution system may further generate one or more deceleration controls for a first of the two available electric motors at operation 316. If the rate of change of torque is associated with a range of rates of change of torque associated with one of the two available motors, at operation 316, the deceleration distribution system may generate one or more deceleration controls for the first of the two available electric motors without generating controls for the second motor. In examples, the first motor may be preferred and therefore used for all braking operations (e.g., a leading axle electric motor), with the second motor being used in situations where the needed rate of change of torque exceeds the achievable (e.g., maximum achievable) rate of change of torque for the first motor.

At operation 318, the deceleration distribution system may determine whether to use the friction braking component configured at the vehicle for friction braking. For example, the deceleration distribution system may determine whether the rate of change of torque (e.g., determined at operation 310) to be implemented falls within a range of rates of change of torque (e.g., where such ranges may be determined at operation 308) associated with the friction braking component. If the rate of change of torque is associated with a range of rates of change of torque associated with the friction braking component, at operation 320, the deceleration distribution system may generate one or more deceleration controls for the friction braking component. If the rate of change of torque is associated with a range of rates of change of torque that is not associated with the friction braking component, the deceleration distribution system may not generate deceleration controls for the friction braking components. In examples, one or both of the electric motors may be preferred and therefore used for braking operations before involving the friction braking component, with the friction braking component being used in situations where the needed rate of change of torque exceeds the achievable (e.g., maximum achievable) rate of change of torque for the combination of the first and second electric motor.

At operation 322, the deceleration distribution system may transmit deceleration command(s) to implement the determined deceleration controls at one or more of the vehicle's deceleration components.

FIG. 4A is a top-down view of an example environment 400 in which a vehicle 402 may be traveling. The vehicle 402 may be sharing the environment 400 with other objects, such as a stop sign 420 and a pedestrian 422. The vehicle 402 may be configured with a vehicle computing system 404 that may include one or more processors 406, memory 408, one or more vehicle control components 410, and/or one or more deceleration distribution components 412. The vehicle 402 may be configured with one or more deceleration components, such as one or more friction braking components 414, one or more leading axle regenerative braking components 416, and one or more trailing axle regenerative braking components 418. The vehicle 402 may be configured with a sensor system that may allow a vehicle computing system configured at the vehicle 402 to collect data in the environment 400, detect objects, make various determinations, etc. Such a sensor system may interact with the vehicle control component(s) 410 to control the vehicle and/or provide environmental and/or vehicle condition data to the deceleration distribution component(s) 412 for use in deceleration distribution operations.

The deceleration distribution component(s) 412 may determine deceleration data for the vehicle 402 and/or the deceleration components 414, 416, and 418. For example, the deceleration distribution component(s) 412 may determine a current overall vehicle torque as well as achievable torque values and/or achievable rate of change of torque values for the individual deceleration components 414, 416, and 418. The distances 414a, 416a, and 418a illustrated in this example may be the shortest distances achievable using (e.g., only) the individual deceleration components 414, 416, and 418, respectively, to bring the vehicle 402 to a stop based on the current overall vehicle torque and the achievable torque values and/or achievable rate of change of torque values for the individual deceleration components 414, 416, and 418.

The deceleration distribution component(s) 412 may also determine, as deceleration data for the vehicle 402, ranges of rates of change of torque for various combinations of individual deceleration components 414, 416, and 418 based on the achievable rates of change of torque for these individual deceleration components and the current overall vehicle torque.

The deceleration distribution component(s) 412 may receive deceleration input corresponding to slowing the vehicle 402 to a stop at or before the stop sign 420. The distance 424 may represent the distance available to the vehicle 402 to stop before reaching the stop sign 420.

Based on this deceleration input and a current vehicle torque, the deceleration distribution component(s) 412 may determine a rate of change of torque needed to adjust the vehicle torque from its current torque to a torque associated with stopping at or before the stop sign 420 (e.g., within the distance 424). As shown here, any of the distances 414a, 416a, and 418a, corresponding to achievable stopping distances using (e.g., only) individual deceleration components 414, 416, and 418, are shorter than the distance 424. Therefore, the deceleration distribution component(s) 412 may determine to control a single deceleration component to bring the vehicle 402 to a stop. For example, the deceleration distribution component(s) 412 may transmit a deceleration command to the leading axle regenerative braking component(s) 416 to control that component to change its torque according to the determined rate of change of torque associated with adjusting the vehicle torque from its current torque to a torque associated with stopping at or before the stop sign 420 (e.g., within the distance 424).

FIG. 4B is another top-down view of the example environment 400 in which the vehicle 402 may be traveling. In this example, the deceleration distribution component(s) 412 may receive deceleration input corresponding to slowing the vehicle 402 to a stop at or before encountering the pedestrian 422. The distance 426 may represent the distance available to the vehicle 402 to stop before encountering the pedestrian 422. In examples, this deceleration input may be generated based on sensors of the vehicle 402 detecting the imminent crossing of a predicted trajectory of the pedestrian 422 with a planned trajectory of the vehicle 402.

Based on this deceleration input and a current vehicle torque, the deceleration distribution component(s) 412 may determine a rate of change of torque needed to adjust the vehicle torque from its current torque to a torque associated with stopping at or before a predicted location of the pedestrian 422 (e.g., within the distance 426). As shown here, none of the distances 414a, 416a, and 418a, corresponding to achievable stopping distances using (e.g., only) individual deceleration components 414, 416, and 418, are shorter than the distance 426. Therefore, the deceleration distribution component(s) 412 may determine to control multiple deceleration components to bring the vehicle 402 to a stop within the distance 426.

For example, the deceleration distribution component(s) 412 may determine that a rate of change of overall vehicle torque needed to adjust the vehicle torque from its current torque to a torque associated with stopping at or before a predicted location of the pedestrian 422 (e.g., within the distance 426) is within a range of rates of change of torque associated with the achievable rates of change of torque for both the leading axle regenerative braking component(s) 416 and the trailing axle regenerative braking component(s) 418. Alternatively or additionally, the deceleration distribution component(s) 412 may determine that a rate of change of overall vehicle torque needed to adjust the vehicle torque from its current torque to the torque associated with stopping at or before reaching the pedestrian 422 is within a range of rates of change of torque associated with the achievable rates of change of torque for all three of the deceleration components 414, 416, and 418.

Based on determining a range of rates of change of torque within which the rate of change of overall vehicle torque needed to adjust the vehicle torque from its current torque to the torque associated with stopping at or before reaching the pedestrian 422, the deceleration distribution component(s) 412 may generate and transmit one or more deceleration commands to the deceleration components associated with that range to change the torque at such components such that the vehicle slows to a stop at or before reaching the pedestrian 422 (e.g., within the distance 426).

Figure 5:
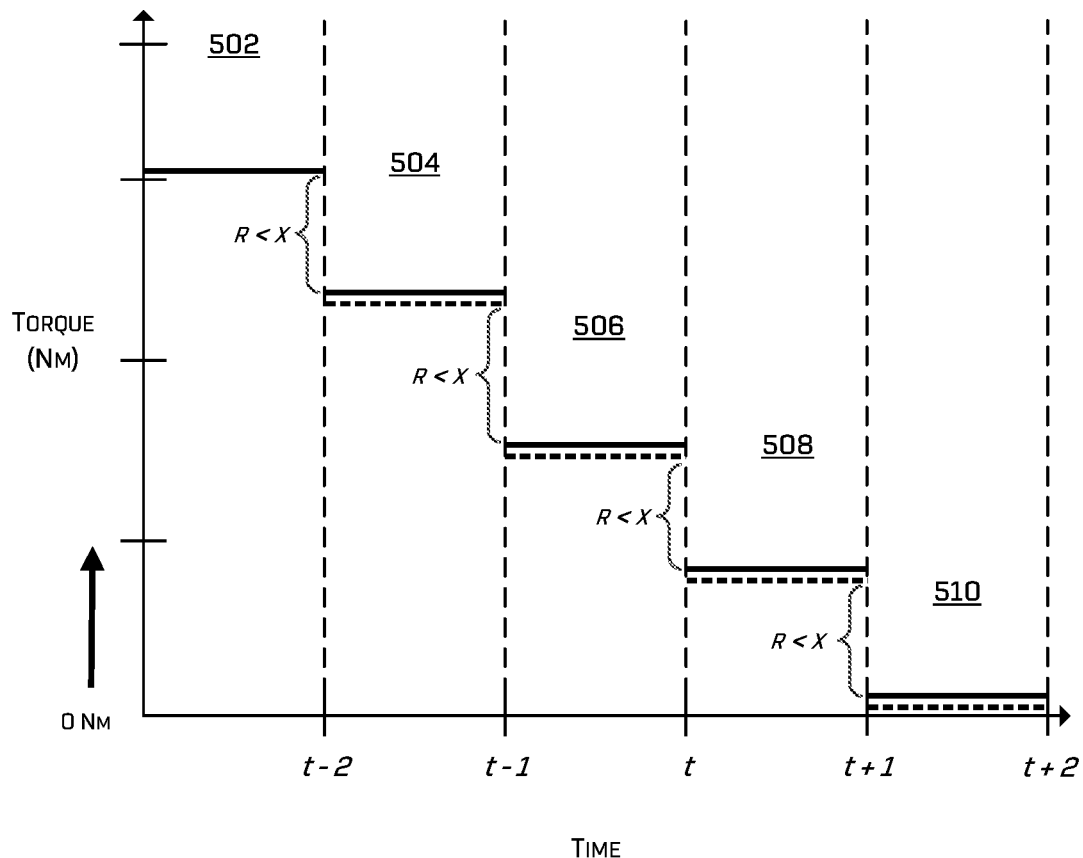
FIG. 5 depicts a graphical representation of deceleration distribution component input and output, in accordance with examples of the disclosure.

FIG. 5 illustrates a graphical representation 500 of torque and torque change rates that may be implemented at a vehicle by one or more deceleration distribution components or systems as described herein. In various examples, a deceleration distribution component may receive deceleration input (solid line; see FIG. 5 legend) from a vehicle controller. In response to such input, the deceleration distribution component may implement various deceleration controls at one or more deceleration components (dashed lines; see FIG. 5 legend).

In determining deceleration controls, the deceleration distribution component may determine a rate of change necessary to adjust the overall vehicle torque from a current torque to a target torque (associated with a received deceleration input), as described herein. In performing this determination, the deceleration distribution component may determine achievable rates of change of torque for individual available deceleration components. Using these achievable rates of change of torque, the deceleration distribution component may further determine ranges of rates of change of torque for various combinations of the individual deceleration components. The deceleration distribution component may then determine a range of such ranges within which the rate of change needed to adjust the overall vehicle torque from the current torque to the target torque falls.

Referring again to FIG. 5, the representation 500 may show times at which torque may be adjusted (t), where t is a current time. As indicated in this figure, a deceleration distribution component input may be received at t−2, t−1, t, and t+1, which bound time periods 502, 504, 506, 508, and 510. The operative deceleration distribution component input for an individual time period may be less than the deceleration distribution component input for a previous time period (e.g., deceleration distribution component input at time period 504 is associated with a torque value that is less than the torque value associated with time period 502, and so forth). The rate of change of torque for transitioning from the torque at one time period to the torque at another based on the deceleration distribution component input is represented as r.

As represented herein, the rate of change r may be less than an achievable rate of change of torque for an individual deceleration component. For example, as shown in the figure, the (e.g., maximum) achievable rate of change of torque for the leading axle regenerative braking component may be x, the (e.g., maximum) achievable rate of change of torque for the trailing axle regenerative braking component may bey, and the (e.g., maximum) achievable rate of change of torque for the friction braking component may be z. In this example, a maximum torque on the leading axle regenerative braking component may be greater than the achievable rate of change of torque applied over the time period from t−2 to t+2, thereby allowing the use of the individual leading axle regenerative braking component to implement the requested deceleration reflected in the deceleration distribution component input without involving the trailing axle regenerative braking component and the friction braking component.

Because r for the individual time periods 502, 504, 506, 508, and 510 may be less than x, the deceleration distribution component may determine to use (e.g., control) the leading axle regenerative braking component (e.g., only) to implement the change in torque at the individual time periods without using the trailing axle regenerative braking component or the friction braking component. Accordingly, there is no control implemented or indicated in this figure for the trailing axle regenerative braking component or the friction braking component.

Figure 6:
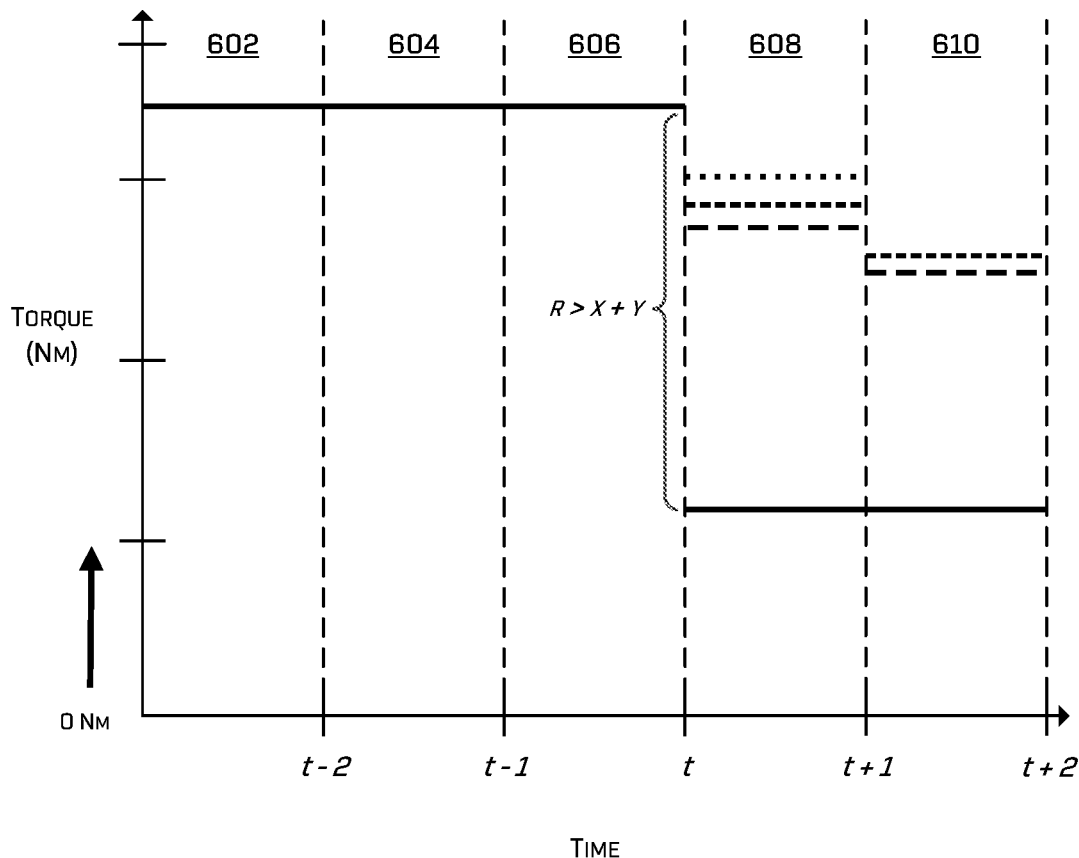
FIG. 6 depicts another graphical representation of deceleration distribution component input and output, in accordance with examples of the disclosure.

FIG. 6 illustrates a graphical representation 600 of torque and torque change rates that may be implemented at a vehicle by one or more deceleration distribution components or systems as described herein. In this example, similar to the example of FIG. 5, a deceleration distribution component may receive deceleration input (solid line; see FIG. 6 legend) from a vehicle controller. In response to such input, the deceleration distribution component may implement various deceleration controls at one or more deceleration components (dashed lines; see FIG. 6 legend).

As with the previous example, the deceleration distribution component may determine a rate of change necessary to adjust the overall vehicle torque from a current torque to a target torque (associated with a received deceleration input), as described herein. As indicated in this figure, such deceleration distribution component input may be received at t−2, t−1, t, and t+1, which bound time periods 602, 604, 606, 608, and 610. In this example, the operative deceleration distribution component input for the time periods 602, 604, and 606 may be the same or substantially similar, thereby resulting in no change in torque during these time periods.

At time t, the deceleration distribution component may receive deceleration distribution component input corresponding to torque to be implemented in time period 608 that is significantly less than the torque implemented within the time period 606. The deceleration distribution component may determine a rate of change of torque for transitioning from the torque at time period 606 to the torque at time period 608.

As represented herein, the rate of change of torque r may be greater than the combinations of the achievable rate of change of torque x for the leading axle regenerative braking component and the achievable rate of change of torque y for the trailing axle regenerative braking component. Therefore, the deceleration distribution component may determine to use (e.g., control) the combination of the leading axle regenerative braking component, the trailing axle regenerative braking component, and the friction braking component to implement the change in torque, as shown by the dashed lines in this figure. In this example, because a maximum torque possible for a combination of the leading axle regenerative braking component and the trailing axle regenerative braking component may be less than the requested torque that can be implemented using achievable rates of change of torque for those components over the time period from t−2 to t+1, the friction braking component may be also be used along with the leading axle regenerative braking component and the trailing axle regenerative braking component to achieve the desired torque as represented by the deceleration distribution component input. In examples, the goal may be to implement the amount of torque as close to as possible, or equal to, the requested torque reflected in the deceleration distribution component input. In this example, the sum of the torque implemented by the three braking components may be less than the requested torque reflected in the deceleration distribution component input.

At time period 610, while the deceleration distribution component input may be the same as at time period 608, because the vehicle has slowed due to the use of the friction braking component, the leading axle regenerative braking component, and the trailing axle regenerative braking component at time period 608, the rate of change of torque required to bring the vehicle to the requested torque may be less than at time t. Therefore, as shown here, because a maximum torque possible for a combination of the leading axle regenerative braking component and the trailing axle regenerative braking component may be greater than the requested torque that can be implemented using achievable rates of change of torque for those components over the time period from t+1 to t+2, the friction braking component may not be needed, and the vehicle may be slowed using the with the leading axle regenerative braking component and the trailing axle regenerative braking component to achieve the desired torque as represented by the deceleration distribution component input. Here again, the goal may be to implement the amount of torque as close to as possible, or equal to, the requested torque reflected in the deceleration distribution component input. In this example, the sum of the torque implemented by the leading axle regenerative braking component and the trailing axle regenerative braking component may be sufficient to bring the overall vehicle torque to the requested torque associated with the deceleration distribution component input.

FIG. 7 depicts a block diagram of an example system 700 for implementing the techniques described herein. In at least one example, the system 700 can include a vehicle 702. The vehicle 702 can include a vehicle computing system or device 704 that may function as and/or perform the functions of a vehicle controller for the vehicle 702. The vehicle 702 can also include one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the vehicle computing device 704 stores a localization component 720, a perception component 722, a planning component 724, one or more system controllers 726, one or more maps 728, a prediction component 730, one or more trajectory determination systems 732, and/or a deceleration distribution system 734. Though depicted in FIG. 7 as residing in memory 718 for illustrative purposes, it is contemplated that individual of the localization component 720, the perception component 722, the planning component 724, the one or more system controllers 726, the one or more maps 728, the prediction component 730, the trajectory determination system(s) 732, and/or the deceleration distribution system 734 can additionally, or alternatively, be accessible to the vehicle 702 (e.g., stored remotely). Alternatively or additionally, the trajectory determination system(s) 732 and/or the deceleration distribution system 734 may be a component of and/or associated with a remote computing device and/or a separate (e.g., secondary) computing device.

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for generating map data, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 722 can provide processed sensor data that indicates one or more characteristics associated with a detected entity (e.g., a tracked object) and/or the environment in which the entity is positioned. The perception component 722 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 724 can determine a path for the vehicle 702 to follow to traverse through an environment. In examples, the planning component 724 can determine various routes and trajectories and various levels of detail. For example, the planning component 724 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In at least one example, the vehicle computing device 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

The memory 718 can further include one or more maps 728 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 728 can include at least one map (e.g., images and/or a mesh). In some examples, the vehicle 702 can be controlled based at least in part on the maps 728. That is, the maps 728 can be used in connection with the localization component 720, the perception component 722, and/or the planning component 724 to determine a location of the vehicle 702, identify objects in an environment, and/or generate routes and/or trajectories to navigate within an environment.

In some examples, the one or more maps 728 can be stored on a remote computing device(s) (such as the computing device(s) 742) accessible via network(s) 740. In some examples, multiple maps 728 can be stored based on, for example, a characteristic (e.g., type of entity, time of day, day of week, season of the year, etc.). Storing multiple maps 728 can have similar memory requirements but increase the speed at which data in a map can be accessed.

In general, the prediction component 730 can generate predicted trajectories of objects in an environment. For example, the prediction component 730 can generate one or more predicted trajectories for vehicles, pedestrians, animals, and the like within a threshold distance from the vehicle 702. In some instances, the prediction component 730 can measure a trace of an object and generate a trajectory for the object based on observed and predicted behavior. The prediction component 730 may interact with the trajectory determination system(s) 732, and/or the deceleration distribution system 734, to determine an operational trajectory, for example, based on one or more candidate trajectories.

In some instances, aspects of some or all of the components discussed herein can include any models, algorithms, and/or machine learning algorithms. For example, in some instances, the components in the memory 718 (and the memory 746, discussed below) can be implemented as a neural network. For instance, the memory 718 may include a deep tracking network that may be configured with a convolutional neural network (CNN). The CNN may include one or more convolution/deconvolution layers. Alternatively, or in addition, the one or more trajectory determination systems 732 and/or the deceleration distribution system 734 may include or be implemented by a CNN that may perform operations as described herein.

An example neural network is an algorithm that passes input data through a series of connected layers to produce an output. Each layer in a neural network can also comprise another neural network or can comprise any number of layers, each of which may be convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory.

For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 706 can include multiple instances of each of these or other types of sensors. For instance, the camera sensors can include multiple cameras disposed at various locations about the exterior and/or interior of the vehicle 702. The sensor system(s) 706 can provide input to the vehicle computing device 704. Additionally, or alternatively, the sensor system(s) 706 can send sensor data, via the one or more networks 740, to the one or more computing device(s) at a particular frequency, after a lapse of a predetermined period of time, in near real-time, etc.

The vehicle 702 can also include one or more emitters 708 for emitting light (visible and/or non-visible) and/or sound. The emitter(s) 708 in an example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 740. For example, the communications connection(s) 710 can enable Wi-Fi-based communication such as via frequencies defined by the IEEE 802.11 standards, short-range wireless frequencies such as Bluetooth, cellular communication (e.g., 2G, 3G, 4G, 4GLTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). In examples, the drive system(s) 714 may include one or more ergative braking systems 736 and/or one or more friction braking systems 738. Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 may also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In some examples, the vehicle 702 can send sensor data, audio data, collision data, and/or other types of data to one or more computing device(s) 742 via the network(s) 740. In some examples, the vehicle 702 can send raw sensor data to the computing device(s) 742. In other examples, the vehicle 702 can send processed sensor data and/or representations of sensor data (e.g., multichannel data structures representing sensor data) to the computing device(s) 742. In some examples, the vehicle 702 can send sensor data to the computing device(s) 742 at a particular frequency, after a lapse of a predetermined period of time, in near real-time, etc. In some cases, the vehicle 702 can send sensor data (raw or processed) to the computing device(s) 742 as one or more log files.

The computing device(s) 742 can include processor(s) 744 and a memory 746 storing one or more perception components 748, planning components 750, one or more trajectory determination systems 752, and/or a deceleration distribution system 754. In some instances, the one or more trajectory determination systems 752 and/or the deceleration distribution system 754 can substantially correspond to the one or more trajectory determination systems 732 and the deceleration distribution system 734, respectively, and can include substantially similar functionality. In some instances, the perception component 748 can substantially correspond to the perception component 722 and can include substantially similar functionality. In some instances, the planning component 750 can substantially correspond to the planning component 724 and can include substantially similar functionality.

The processor(s) 716 of the vehicle 702 and the processor(s) 744 of the computing device(s) 742 can be any suitable processor capable of executing instructions to process data and perform operations as described herein. By way of example and not limitation, the processor(s) 716 and 744 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 746 are examples of non-transitory computer-readable media. The memory 718 and 746 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 742 and/or components of the computing device(s) 742 can be associated with the vehicle 702. That is, the vehicle 702 can perform one or more of the functions associated with the computing device(s) 742, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: determining a target torque based at least in part on deceleration input received from a vehicle controller; determining a current torque for the vehicle; determining a rate of change of torque associated with adjusting a vehicle torque from the current torque to the target torque; and determining, based at least in part on the rate of change of torque, one or more of: controlling a first regenerative braking system of the vehicle if the rate is less than or equal to a first threshold rate, controlling the first regenerative braking system of the vehicle and a second regenerative braking system if the rate is greater than the first threshold rate and less than or equal to a second threshold rate, or controlling the first regenerative braking system, the second regenerative braking system, and a friction braking system if the rate is greater than the second threshold.

B: The system of paragraph A, wherein the first regenerative braking system is configured at a trailing axle of the vehicle.

C: The system of paragraph A or B, wherein the first threshold rate is determined based at least in part on a maximum achievable rate of change of torque of the first regenerative braking system.

D: The system of any of paragraphs A-C, wherein the operations further comprise: receiving, as auxiliary data, at least one of vehicle condition data or environment condition data; and determining the first threshold rate based at least in part on the auxiliary data.

E: The system of any of paragraphs A-D, wherein the vehicle controller comprises one or more of: an autonomous vehicle computing system, a brake pedal component, a braking assistance system, or a remote vehicle control system.

F: One or more non-transitory computer-readable media storing instructions that, when executed by one or more processors, perform operations comprising: receiving a first kinematic value for a first deceleration system configured at a vehicle; receiving a second kinematic value for a second deceleration system configured at the vehicle; determining a target torque based at least in part on a deceleration command received from a vehicle controller; determining a current torque for the vehicle; determining that a deceleration kinematic value associated with adjusting a vehicle torque from the current torque to the target torque is greater than the first kinematic value; and controlling the first deceleration system and the second deceleration system based at least in part on determining that the deceleration kinematic value is greater than the first kinematic value.

G: The one or more non-transitory computer-readable media of paragraph F, wherein: the second deceleration system comprises a first deceleration component and a second deceleration component; the second kinematic value is associated with the first deceleration component and a third kinematic value is associated with the second deceleration component; and controlling the first deceleration system and the second deceleration system comprises controlling the first deceleration component and excluding control of the second deceleration component based at least in part on determining that the deceleration kinematic value is greater than the second kinematic value and that the deceleration kinematic value is less than the third kinematic value.

H: The one or more non-transitory computer-readable media of paragraph G, wherein: the first deceleration component comprises a first electric motor configured to perform regenerative braking; and the second deceleration component comprises a second electric motor configured to perform regenerative braking.

I: The one or more non-transitory computer-readable media of any of paragraphs F-H, wherein the second deceleration system comprises a friction braking system.

J: The one or more non-transitory computer-readable media of any of paragraphs F-I, wherein the operations further comprise: determining that the deceleration kinematic value associated with adjusting the vehicle torque from the current torque to the target torque is greater than the second kinematic value; and controlling a third first deceleration system based at least in part on determining that the deceleration kinematic value is greater than the second kinematic value.

K: The one or more non-transitory computer-readable media of any of paragraphs F-J, wherein the operations further comprise: determining that the deceleration kinematic value associated with adjusting the vehicle torque from the current torque to the target torque is less than the second kinematic value; and excluding control of a third first deceleration system based at least in part on determining that the deceleration kinematic value is less than the second kinematic value.

L: The one or more non-transitory computer-readable media of any of paragraphs F-K, wherein: the first kinematic value is based at least in part on a first maximum achievable rate of change of a kinematic property for the first deceleration system; and the second kinematic value is based at least in part on a second maximum achievable rate of change of the kinematic property for the second deceleration system.

M: The one or more non-transitory computer-readable media of any of paragraphs F-L, wherein at least one of the first kinematic value and the second kinematic value is based at least in part on at least one of vehicle condition data or environment condition data.

N: The one or more non-transitory computer-readable media of any of paragraphs F-M, wherein controlling the first deceleration system and the second deceleration system is further based at least in part on environment condition data.

O: A method comprising: receiving a first rate of change of a kinematic value for a first deceleration system configured at a vehicle; receiving a second rate of change for the kinematic value for a second deceleration system configured at the vehicle; determining a torque adjustment based at least in part on deceleration input; determining that a third rate of change of the kinematic value associated with the torque adjustment is greater than the first rate of change of the kinematic value; and controlling at least one of the first deceleration system or the second deceleration system based at least in part on determining that the third rate of change of the kinematic value is greater than the first rate of change of the kinematic value.

P: The method of paragraph O, wherein the first deceleration system comprises a first electric motor capable of regenerative braking and a second electric motor capable of regenerative braking.

Q: The method of paragraph O or P, wherein the second deceleration system comprises a first friction braking component and a second friction braking component.

R: The method of any of paragraphs O-Q, wherein controlling the at least one of the first deceleration system or the second deceleration system comprises controlling the first deceleration system and the second deceleration system based at least in part on determining that the third rate of change of the kinematic value is greater than the second rate of change for the kinematic value.

S: The method of any of paragraphs O-R, wherein: the method further comprises receiving a fourth rate of change for the kinematic value for a third deceleration system configured at the vehicle; and controlling the first deceleration system and the second deceleration system comprises controlling the first deceleration system and the second deceleration system and excluding the third deceleration system based at least in part on determining that the third rate of change of the kinematic value is less than the fourth rate of change for the kinematic value.

T: The method of any of paragraphs O-S, wherein the deceleration input is received from one or more of: an autonomous vehicle computing system, a brake pedal component, a braking assistance system, or a remote vehicle control system.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
   determining a target torque based at least in part on deceleration input received from a vehicle controller associated with a vehicle;
   determining a current torque for the vehicle;
   determining a rate of change of torque associated with adjusting a vehicle torque from the current torque to the target torque; and
   determining, based at least in part on the rate of change of torque, one or more of:
      controlling a first regenerative braking system of the vehicle if the rate is less than or equal to a first threshold rate,
      controlling the first regenerative braking system of the vehicle and a second regenerative braking system if the rate is greater than the first threshold rate and less than or equal to a second threshold rate, or
      controlling the first regenerative braking system, the second regenerative braking system, and a friction braking system if the rate is greater than the second threshold rate.

2. The system of claim 1, wherein the first regenerative braking system is configured at a trailing axle of the vehicle.

3. The system of claim 1, wherein the first threshold rate is determined based at least in part on a maximum achievable rate of change of torque of the first regenerative braking system.

4. The system of claim 1, wherein the operations further comprise:
receiving, as auxiliary data, at least one of vehicle condition data or environment condition data; and
determining the first threshold rate based at least in part on the auxiliary data.

5. The system of claim 1, wherein the vehicle controller comprises one or more of:
an autonomous vehicle computing system,
a brake pedal component,
a braking assistance system, or
a remote vehicle control system.

6. One or more non-transitory computer-readable media storing instructions that, when executed by one or more processors, perform operations comprising:
receiving a first kinematic value for a first deceleration system configured at a vehicle;
receiving a second kinematic value for a second deceleration system configured at the vehicle;
determining a target torque based at least in part on a deceleration command received from a vehicle controller;
determining a current torque for the vehicle;
determining that a deceleration kinematic value representing a rate of change of torque associated with adjusting a vehicle torque from the current torque to the target torque is greater than the first kinematic value; and
controlling the first deceleration system and the second deceleration system based at least in part on determining that the deceleration kinematic value is greater than the first kinematic value.

7. The one or more non-transitory computer-readable media of claim 6, wherein:
the second deceleration system comprises a first deceleration component and a second deceleration component;
the second kinematic value is associated with the first deceleration component and a third kinematic value is associated with the second deceleration component; and
controlling the first deceleration system and the second deceleration system comprises controlling the first deceleration component and excluding control of the second deceleration component based at least in part on determining that the deceleration kinematic value is greater than the second kinematic value and that the deceleration kinematic value is less than the third kinematic value.

8. The one or more non-transitory computer-readable media of claim 7, wherein:
the first deceleration component comprises a first electric motor configured to perform regenerative braking; and
the second deceleration component comprises a second electric motor configured to perform regenerative braking.

9. The one or more non-transitory computer-readable media of claim 6, wherein the deceleration kinematic value is determined based at least in part on sensor data indicating wear on at least one of a first deceleration component of the first deceleration system or a second deceleration component of the second deceleration system.

10. The one or more non-transitory computer-readable media of claim 6, wherein the operations further comprise:
determining that the deceleration kinematic value associated with adjusting the vehicle torque from the current torque to the target torque is greater than the second kinematic value; and
controlling a third deceleration system based at least in part on determining that the deceleration kinematic value is greater than the second kinematic value.

11. The one or more non-transitory computer-readable media of claim 6, wherein the operations further comprise:
determining that the deceleration kinematic value associated with adjusting the vehicle torque from the current torque to the target torque is less than the second kinematic value; and
excluding control of a third deceleration system based at least in part on determining that the deceleration kinematic value is less than the second kinematic value.

12. The one or more non-transitory computer-readable media of claim 6, wherein:
the first kinematic value is based at least in part on a first maximum achievable rate of change of a kinematic property for the first deceleration system; and
the second kinematic value is based at least in part on a second maximum achievable rate of change of the kinematic property for the second deceleration system.

13. The one or more non-transitory computer-readable media of claim 6, wherein at least one of the first kinematic value and the second kinematic value is based at least in part on at least one of vehicle condition data or environment condition data.

14. The one or more non-transitory computer-readable media of claim 6, wherein controlling the first deceleration system and the second deceleration system is further based at least in part on environment condition data.

15. A method comprising:
receiving a first rate of change of a kinematic value for a first deceleration system configured at a vehicle;
receiving a second rate of change for the kinematic value for a second deceleration system configured at the vehicle;
determining a torque adjustment based at least in part on deceleration input;
determining that a third rate of change of the kinematic value associated with the torque adjustment is greater than the first rate of change of the kinematic value; and
controlling at least one of the first deceleration system or the second deceleration system based at least in part on determining that the third rate of change of the kinematic value is greater than the first rate of change of the kinematic value.

16. The method of claim 15, wherein the first deceleration system comprises a first electric motor capable of regenerative braking and a second electric motor capable of regenerative braking.

17. The method of claim 15, wherein the second deceleration system comprises a first friction braking component and a second friction braking component.

18. The method of claim 15, wherein controlling the at least one of the first deceleration system or the second deceleration system comprises controlling the first deceleration system and the second deceleration system based at least in part on determining that the third rate of change of the kinematic value is greater than the second rate of change for the kinematic value.

19. The method of claim 15, wherein:
the method further comprises receiving a fourth rate of change for the kinematic value for a third deceleration system configured at the vehicle; and
controlling the first deceleration system and the second deceleration system comprises controlling the first deceleration system and the second deceleration system and excluding the third deceleration system based at least in part on determining that the third rate of change of the kinematic value is less than the fourth rate of change for the kinematic value.

20. The method of claim 15, wherein the deceleration input is received from one or more of:
an autonomous vehicle computing system,
a brake pedal component,
a braking assistance system, or
a remote vehicle control system.

* * * * *